May 12, 1953 J. P. BUTTERFIELD ET AL 2,638,356
AUTOMOTIVE SUSPENSION SYSTEM
Filed Aug. 23, 1951 4 Sheets-Sheet 1

INVENTORS.
John P. Butterfield
Victor Hughes
BY Harness and Harris
ATTORNEYS.

May 12, 1953   J. P. BUTTERFIELD ET AL   2,638,356
AUTOMOTIVE SUSPENSION SYSTEM
Filed Aug. 23, 1951   4 Sheets-Sheet 2

INVENTORS.
John P. Butterfield
Victor Hughes.
BY Harness and Harris
ATTORNEYS

May 12, 1953   J. P. BUTTERFIELD ET AL   2,638,356
AUTOMOTIVE SUSPENSION SYSTEM

Filed Aug. 23, 1951   4 Sheets-Sheet 3

INVENTORS.
John P. Butterfield.
Victor Hughes.
BY Harness and Harris
ATTORNEYS.

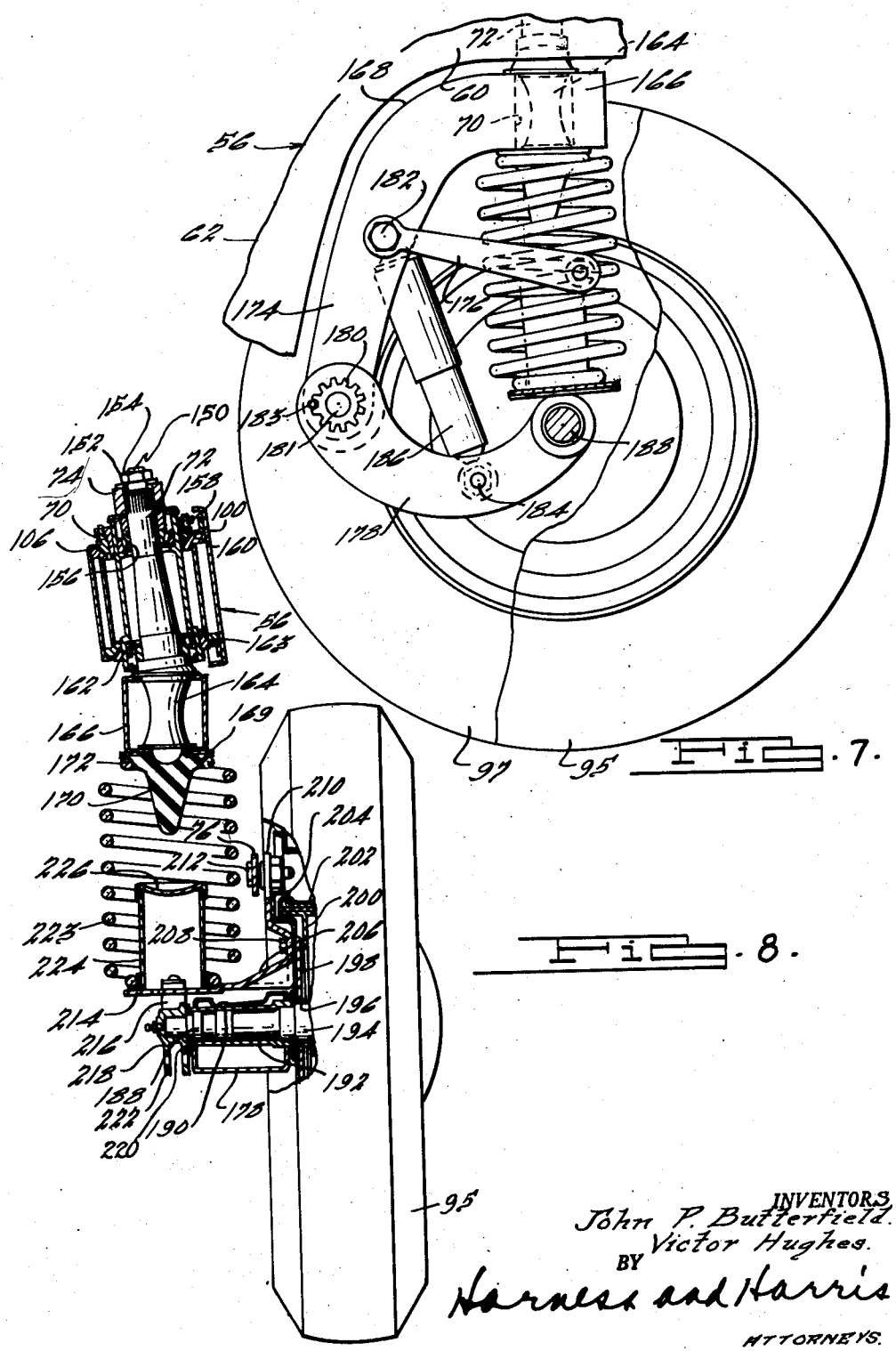

Patented May 12, 1953

2,638,356

UNITED STATES PATENT OFFICE 2,638,356

AUTOMOTIVE SUSPENSION SYSTEM

John P. Butterfield, Grosse Pointe Park, and Victor Hughes, Pleasant Ridge, Mich., assignors to Chrysler Corporation, Highland Park, Mich., a corporation of Delaware Application August 23, 1951, Serial No. 243,334

9 Claims. (Cl. 280—95)

This application relates to a steerable wheel suspension for automotive vehicles, and more particularly to a link-type independent front suspension for a vehicle steered by a sprung steering mechanism.

An object of the present invention is to provide a parallelogram type suspension linkage for a vehicle having a steerable wheel, the suspension not only fully serving the purpose of guiding the wheel and constraining it in its movements, but being of the character in which the joints and links are relatively lightly loaded by the weight of the vehicle. In carrying out this object, a strategically located load spring means is arranged to take static loadings and similar loadings substantially directly without the necessity of many of the links and joints lying in the path of the forces transmitted.

Another object is to provide a kingpin-supported parallelogram type of spring suspension linkage of which the supporting kingpin is disposed at all times vertically spaced above the respective links and vertically in line with the associated load spring. The kingpin is thus rendered a sprung member having the load spring in a substantially straight mechanical path shielding the kingpin from directly-applied road shocks. When a steering linkage is applied so as to be connected to such a sprung kingpin, the steering linkage is in a situation likewise of being sprung, and by reason thereof reflects and manifests a minimum of the effects of abnormal wheel movement of the character commonly referred to as wheel fight.

According to a feature of the invention, provision is made in an independent front suspension to have a steering linkage applied thereto so as to be for the most part arranged high in the engine compartment and thus be considerably remote from danger of damage or misalignment due to being struck by loose road material or by jutting road obstructions sometimes encountered by the structure between front suspensions.

According to a further feature, an independent front suspension for vehicles is provided which affords better ground clearance in many regions beneath the vehicle and between its wheels than is afforded by other suspensions in common usage.

Another object of the invention is to provide for application to a road vehicle, an independent wheel suspension readily sub-assembled and easily installed on the vehicle during manufacture, and moreover readily repaired and serviced on the vehicle after the vehicle has been placed in operation.

A further object of the invention is to provide a relatively light and inexpensive construction for an independent front wheel suspension, the desirable character of which is contributed to by one or more factors already noted including the fact that only strategically located parts in the suspension and relatively few of the interposed joints are subject to the major loadings of the suspension in operation.

According to another feature of the invention, a load-spring-supported independent front suspension is provided which readily lends itself to use of a coil type load spring, the manifest smooth performance characteristics and responsiveness of which are well appreciated in existing front wheel suspensions in known applications.

Other features, objects and advantages will either be specifically pointed out or become apparent when for a better understanding of the invention, reference is made to the following detailed description taken in conjunction with the accompanying drawings in which:

Figures 1, 2, and 3 are side, top, and front views of a vehicle to which the present invention is applied;

Figures 7 and 8 represent side and front enlarged views of the suspension herein disclosed.

Figure 1:
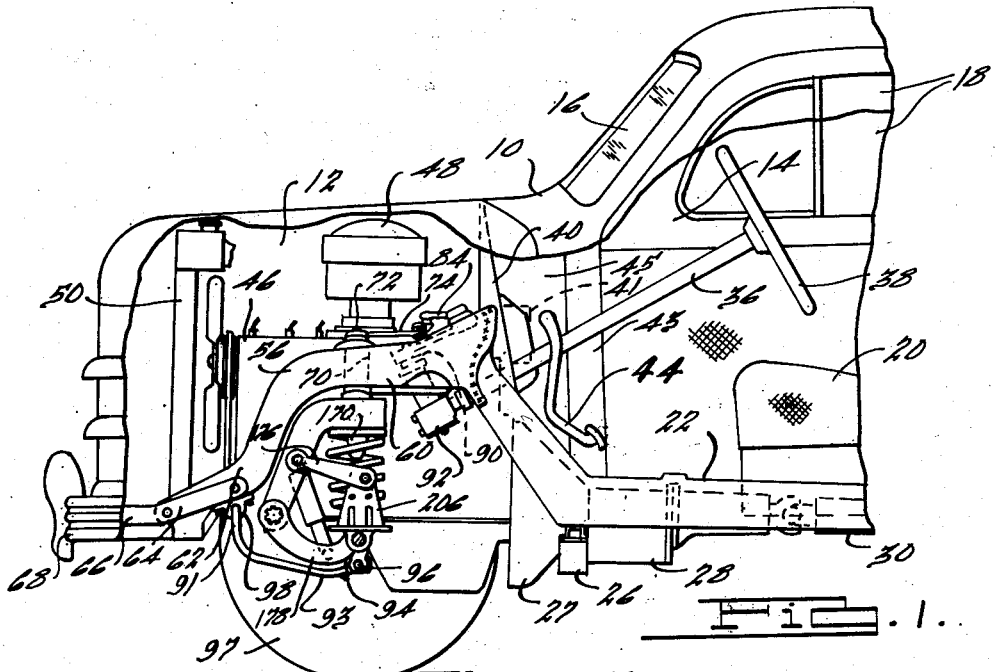
Figure 2:
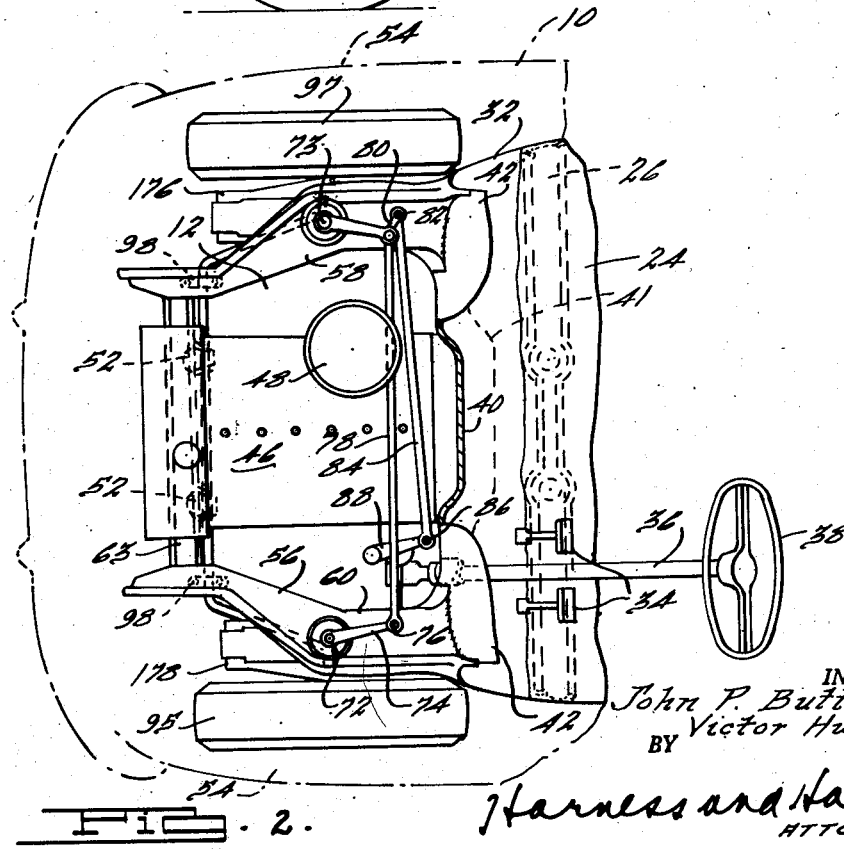
Figure 3:
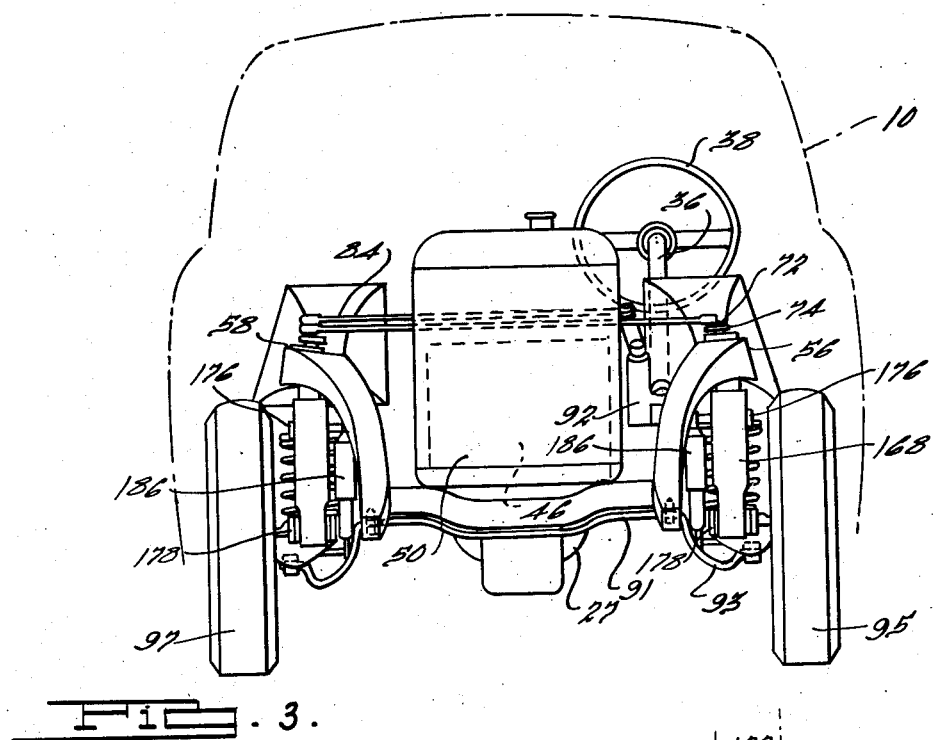

In Figures 1, 2, and 3, an automotive vehicle 10 is shown having at its forward part an engine compartment 12 behind which is located a passenger compartment 14. Passenger compartment 14 forms a part of the vehicle body and is provided with a suitable windshield 16 and side glass 18 on each side of the vehicle body. A driver's seat 20 is disposed in the passenger compartment between a pair of body sills 22 and is securely mounted to a front floor pan 24. The floor pan 24 is reinforced by a plurality of body cross members including the cross member 26 which extends between the body sills 22 and is firmly secured at its end portions to the respective sills. The body cross member 26 carries motor mountings at an intermediate portion thereof which support a clutch housing 27 connected both to the rear of the vehicle power plant and to a transmission 28 which is coupled to the power plant through the clutch in the housing 27.

The tailshaft of transmission 28 is connected to a rearwardly extending propeller shaft 30 by an interposed universal joint connection. Floor pan 24 is angled to form a toe board 32 through which a pair of clutch and brake pedals 34 extend into the passenger compartment 14. A steering column 36 also extends through the toe board 32 and into the passenger compartment and carries a steering wheel 38 for the operator of the vehicle. At its forward end, the passenger compartment 14 is separated from the engine compartment 12 by a dash or dash panel 40 transversely reinforced at 41 and is closed off at its forward sides by cowl side panels 42 extending a short distance along either side of the vehicle. The dash 40 and toe board 32 may or may not be formed from the same unitary piece of sheet material depending on the expediencies of manufacture.

In disposition slightly to the rearward of and inside the cowl side panels 42 there is disposed a pair of upright body pillars 43; a pair of cowl closing plates 45 is disposed inside of the cowl side panels 42 in a location just forwardly of the body pillars 43. Through suitable brackets, not shown, the cowl closing plate 45 on the driver's side of the vehicle supports a foot-operated parking brake 44. In the engine compartment 12 is received a vehicle engine 46 provided with an air cleaner 48, a radiator core 50, and a plurality of engine mountings including forward engine mountings 52.

The engine 46 has provided near its sides a pair of fender shields, not shown, serving as dust shields which are connected to the front fenders 54 and pass adjacent the inner sides of a stationary pair of longitudinal front frame members 56 and 58 to which they are bolted. The frame members 56 and 58 are of box section and are disposed to either side of engine 46 and are substantially symmetrical with respect to the engine. In the interests of brevity, only frame member 56 of the two substantially symmetrical frame members will be described, and will be seen to have a rear portion 60 extending substantially horizontally and a downwardly and forwardly extending portion 62 angled with respect to horizontal portion 60. Portion 62 supports a frame front cross member 63 and is formed at its front end to provide a bumper horn 64 which supports a bumper 68 by means of a bumper support 66. Rear portion 60 of the longitudinal frame member 56 is disposed, as already noted, in a horizontal position and will be observed to be located generally adjacent the plane of the head or top of the vehicle engine 46. Frame member portion 60 is joined to the body structure in a manner which will be hereinafter set forth in detail and is formed with a substantial vertically disposed kingpin bearing opening 70. A kingpin 72 is provided which is adapted to be journalled to rotate in bearing opening 70 and has a steering arm or crank arm 74 splined thereto for use in rotating the kingpin. Crank arm 74 is pivoted at 76 to one end of a tie rod 78 which is similarly connected at its opposite end to another crank arm used to steer a kingpin 73 provided on the opposite side of the vehicle. Tie rod 78 is disposed slightly above the longitudinal body members 56 and 58 and is arranged, as shown, to occupy a position above the plane of the top of the vehicle engine so as to pass non-interferingly thereover during steering movement as it moves about the kingpins which support the crank arms 74. In order to prevent all interference of the engine with the steering linkage, it is desirable that at least the portions of tie rod 78 in the vicinity of the engine be above the plane of the top or the head of the engine 46. Tie rod 78 carries an extension 80 rigid therewith, which is joined by means of a pivot to a drag link 84. Drag link 84 is pivoted at 86 to a pitman 88 which is fast to and rotatable with a rockshaft 90. The rockshaft 90 is driven by the roller of a worm and roller combination, not shown, which are internally located within the casing of a steering gear 92. The steering gear 92 is controlled by a steering shaft, not shown, which is rotatable in the steering column 36 and is controlled by the steering wheel 38. Kingpins 72, 73 support a steerable wheel suspension unit provided for each of a pair of steerable front road wheels 95, 97.

Associated with the suspension unit for each of the steerable wheels 95, 97 is a one-piece anti-roll stabilizer 91 having a central section disposed transversely of the vehicle and having a pair of lever-like trailing legs, one of which is indicated as at 93 to be joined thereto and provided at its extremity with two pivots 94, 96 disposed in series with their axes inclined at 90° angles with respect to one another in order to afford a universal action between the end of the stabilizer leg 93 and one of the respective suspension assembly units for the front wheels 95, 97. The central section of anti-roll stabilizer 91 is journalled to rotate in rubber bearings which are secured by brackets 98 to the frame longitudinal members in the vicinity of the frame horns 64.

Figure 4:
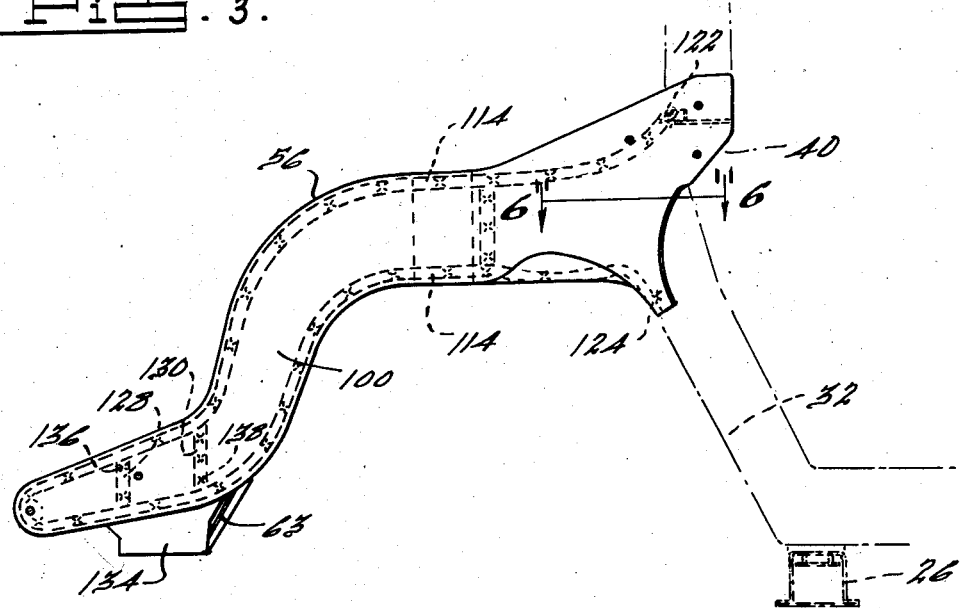
Figures 4 and 5 are respectively a side view and a plan view of the front frame members of the vehicle.
Figure 5:
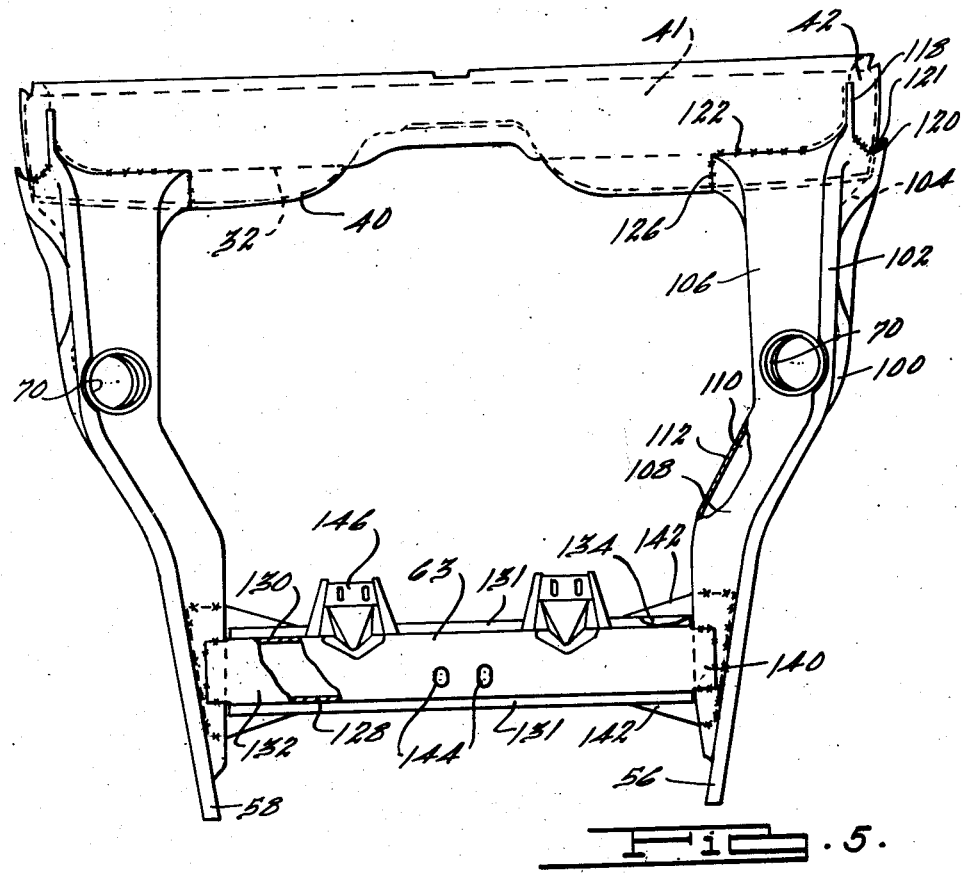
Figure 6:
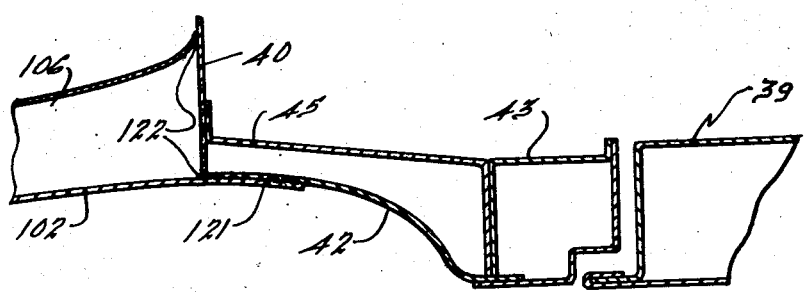
Figure 6 is a section taken on the lines 6—6 of the frame in Figure 4.

In Figures 4, 5, and 6, the box sectioned frame longitudinal member 56 is similar in essential respects to box-sectioned frame longitudinal member 58 and is shown to be composed of a substantially vertically disposed side plate 100 having a companion channel member 106 in association therewith. Side plate 100 is provided top and bottom with short inturned flanges 102 and 104 between which the channel member 106 is received for securement to the vertical plate 100. The channel 106 has top and bottom legs 108, 110 interconnected by a base or web portion 112. The aforesaid legs 108, 110 are deflected at their outer extremities to provide short transversely disposed flanges secured at 114 to the side plate 100 by soldering or welding. Thus the open end of channel 106 is closed off by the relatively deep vertical side plate 100.

The opening 70 for the kingpin bearings, though substantially vertical, will be noted to extend in a slightly downwardly and outwardly direction. At its rear end the side plate 100 provides upper and lower bracket portions 118, 120 which extend alongside of and are secured at 121 to the cowl side panel 42 by soldering or welding. Legs 108 and 110 of channel 106 are secured at their rear ends by welding 122 at the top and the bottom, respectively, to dash 40 and to toe board 32. The base or web portion 112 of channel 106 is securely welded at 126 to dash 40. The frame front cross member 63 is formed of an inverted U-section having depending legs 128, 130 interconnected at the top by a base or web portion 132.

Legs 128, 130 are provided at their lower ends with short transversely disposed flanges 131, to which is welded a closing plate 134 which closes off the open side of the U member to form a box-like section. At the ends of the frame cross member 63 the legs 128, 130 of the inverted U-shaped section are flanged and securely welded as at 136, 138 to the vertically disposed side plate 100. The web 132 has a projecting flange 140 which laps over channel 106 along its upper leg 108 and is secured thereto by welding or soldering. Gussets 142 which pass below the closing plate 134 are welded both to the closing plate and to channel member 106 to provide additional stiffness at the joint between the frame cross member 63 and the longitudinal frame member 56. Intermediate its ends, the frame cross member 63 is formed with openings 144 for receiving the radiator core support, and member 63 is additionally provided with rearwardly offset brackets 146 for receiving the front engine mountings 52. Additional rigidity is provided in the body adjacent the juncture of frame member 56 therewith not only by the channel reinforcement 41 for the dash 40, but also by the cowl side panel 42 and cowl closing plate 45 which can react against the vertically disposed body pillar 43 having a door 39, Figure 6, adapted to be hinged thereto.

In Figures 7 and 8, the kingpin 72 received in the kingpin bearing opening 70 of the body member 56, is shown to have an upper end 150 protruding from the top side of the latter and splined at 152 to receive the steering crank arm 74. Kingpin 72 and crank arm 74 are thus rendered non-rotatable relative to one another and are secured together by a threaded nut 154 received by the upper protruding end of kingpin 72. Kingpin 72 is journalled in a pair of tapered roller bearings, the upper one of which 156, has the outer race thereof held by an eccentric 158 seated at 160 in the structure provided by vertical side member 100 and channel member 106 of frame member 56. Rotation of eccentric 158 in its own plane provides for the caster and camber adjustment of the kingpin 72. The lower bearing 162 of the pair of tapered roller bearings for the kingpin 72 has its outer race mounted in a member 163 corresponding to eccentric 158, but having no adjustment for eccentricity because none is necessary in the lower bearing for purposes of regulating wheel caster and camber already provided for through adjustment of the upper bearing.

Kingpin 72 has a lower end 164 protruding from the bottom side of frame member 56 and having secured thereto the horizontally extending rear portion 166 of an arm structure 168. Horizontal arm portion 166 is welded to the lower end 164 of the kingpin and has a seat member 169 welded to the lower side of arm portion 66. Seat member 169 is of circular construction and receives therebelow a depending rubber bumper member 170 which is substantially vertically aligned with the lower end 164 of the kingpin. Rubber bumper 170 is formed with an annular external groove 172 serving as a spring seat. Arm structure 168 has a forwardly and downwardly depending link-supporting portion 174 forming an angle with respect to the horizontal rear portion 166.

Secured to arm-supporting portion 174 is a pair of vertically spaced suspension trailing links 176, 178. The lower one, 178, of the two links is of box section construction and is provided at its secured end with a pair of spaced trunnion bearings 180. Each bearing is threaded into the link 178 and provided with a notched periphery at its outer end for receiving a lock screw 183 which locks the bearing against rotation relative to the link 178. Link-supporting portion 174 has a pin 181 securely affixed thereto at its lower end, and another pin 182 securely affixed to an intermediate portion of the link-supporting portion 174. The pin 181 projects from both lateral sides of the supporting portion 174 and provides trunnions which are received in the spaced trunnion bearings 181. The lateral span or spacing between bearings 181 is adequate to prevent and overcome any tendency for box-sectioned link 178 to twist about its longitudinal axis. Pin 182 projects from both lateral sides of link-supporting portion 174 and pivotally receives the secured end of the upper link 176. Arm structure 168 is disposed in a substantially vertical plane and supports the upper and lower links 176, 178 for vertical oscillation adjacent to and substantially in this plane. Lower link 178 is provided at an intermediate portion with a pin 184 rigidly affixed thereto.

Between the intermediate portions of lower link 178 and the link-supporting portion 174 of arm structure 168 there is disposed a telescopic double acting shock absorber 186 connected at its respective opposite ends to pin 182 and to pin 184. The shock absorber 186 is on the side of the arm structure 168 opposite to the side occupied by the upper link 176. The lower link 178 has at its trailing end a rigid portion receiving a wheel spindle 188 and by means of a through bolt 190 and a confining sleeve 192 rigidly supports the inner end of the wheel spindle 188 against rotation relative thereto. The outer end 194 of the wheel spindle 188 extends into the hub structure of the wheel 95 and has spaced bearings thereon which are retained in the wheel hub structure to permit rotation of the wheel 95. Wheel 95 has a brake backing plate 198 journalled at 196 for limited angular oscillation with respect to the outer spindle end 194. The brake backing plate 198 supports a pair of brake shoes including a shoe 200 which is mounted for disengageable friction engagement with a brake drum 202 rigidly carried by the wheel 95 for rotation therewith. A brake drum cover 204 extends about the outer periphery of brake drum 202 and is firmly clamped by means of bolts 208 between the brake backing plate 198 and an angled spring seat structure 206. Spring seat structure 206 has an upstanding portion 210 disposed vertically and apertured to receive a pin 212 which is provided with a pressure grease fitting for lubrication and pivotally links the upper link 176 to the structure 206. The spring seat structure 206 has a substantially horizontally disposed portion 214 to which a bracket 216 and a spindle bearing 218 are journalled for slight oscillatory movement about the end of spindle 188. Thus spring seat structure 206 is journalled for slight oscillary rotation with respect to wheel spindle 188 by means of the two bearings 196 and 218. The joint between the lower link box structure 178 and the bearing 218 is sealed with a dust seal at 220. A grease fitting is provided for lubrication of this joint. A downwardly depending connection bracket for the anti-roll stabilizer is provided at 222 and is integrally incorporated with the bearing structure 218. The horizontal portion of the angled spring seat structure 206 is provided with an annular silencer on which is seated a coil load spring 223 having an upper end received in the coil spring receiving annulus 172 provided by the rubber bumper 170. Rubber bumper 170 is thus disposed within the coil spring 223 and, opposing the rubber bumper 170 and likewise disposed within the coil spring, there is provided a short tubular structure 224 having its upper end closed by a dished disc 226 which engages the rubber bumper 170 during extreme movement of the wheel suspension.

The operation of the constructions disclosed in Figures 1 through 8 of the drawings is such as to offer certain distinctive features and advantages which will be best appreciated following a consideration of the unique relationship of the parts of the disclosed suspension. The axis of kingpin 72 though substantially vertical, will be seen to be slightly offset from the vertical such that it intersects the horizontal ground surface across which wheel 95 travels, within a respectable distance of the point of contact of wheel 95 with the ground surface. This distance has a tendency to vary from design to design but with design practices as presently accepted rarely exceeds 3 or 3½ inches in passenger cars for instance. Coil load spring 223 and spring bumper 170 are substantially vertically aligned in all vertical planes with the lower end 164 of kingpin 72. Upper and lower trailing links 176, 178 are arranged to oscillate substantially in the vertical plane of the vertically disposed arm structure 168 and the vertically disposed arm structure swings with the kingpin 72 about the axis of the latter and non-interferingly about the adjacent portions 60, 62 of the frame longitudinal 56.

The ground reaction to the weight of the vehicle is transmitted by the wheel suspension substantially vertically to the frame longitudinals and follows the path from the wheel spindle 188 through the coil spring 223 and/or the rubber bumper assembly 170, 226 directly into the lower end 164 of the kingpin 72. When the suspension is statically loaded and again when the suspension is in a position of extreme jounce, the links 176, 178 may be found to be in a relatively lightly or unloaded status and serving primarily as guide for the wheel 95 in its motion. Under these circumstances, the joints at 181 and 182 are only relatively lightly loaded. Similarly under condition of dynamic loadings, the road shocks then present tend to be fed in a direct line through the kingpin 72 into the frame, being transmitted therethrough only after encountering the vertically aligned coil load spring 223. The kingpin then functions as a purely sprung member sprung by the spring 223 and associated suspension. Moreover, it is primarily directly applied loads to which the kingpin 72 is subjected as contrasted with offset and eccentric loadings of relatively great magnitude which play a prominent part in the stressing of the parts of other vehicle suspensions. Steering crank arm 74 for the kingpin 72 and also the steering crank arm for the oppositely arranged kingpin 73, are likewise sprung members of the suspension and similarly to kingpins 72, 73 do not follow the movements of wheel oscillation in the plane of the wheels.

It is well known that road wheels are frequently subjected to abnormal movements incident to the rising and falling thereof, that is, movement in the plane of the wheels, and this movement is a characteristic of not only suspensions of the independent type, but sometimes manifests itself whether the suspension is of the independent type or otherwise. This abnormal movement is commonly referred to as wheel fight and is particularly objectionable when present in the steering wheels as the same is reflected in the steering mechanism. Neither the steering crank arms for kingpins 73, 72 nor the tie rod 78 and other parts of the steering gear mechanism are connected for vertical movement of oscillation with the wheels and, as a consequence, the steering wheel 38 does not manifest the extreme effects of wheel fight which is so characteristic of certain independent and other type wheel suspension arrangements. The immediate parts of the wheel suspension system associated with the arm structure 168 in one front suspension and its counterpart on the opposite side of the vehicle, may be of relatively light construction owing to the fact that the joints and members are not so extremely loaded as with other common vehicle suspensions; hence an economical and relatively simple and light construction can result.

As herein disclosed, the invention is shown embodied in a steerable wheel suspension arrangement for an independent front suspension. It is evident that the present wheel suspension will be equally effective in suspension arrangements of other types and that the steerable suspension can be equally well mounted appropriately at the rear of certain other vehicles. So also the drawing shows the steering mechanism to be purely mechanically operated, but self-evidently there could be provided a power assist mechanism for the steering gear which like the presently disclosed mechanical steering mechanism would occupy the status of a sprung member on the vehicle. The kingpin bearings are shown to provide for caster and camber adjustment through an eccentricity mounting provided for the upper tapered bearing but, indeed, it is not essential to the invention that the upper bearing be the one eccentrically mounted and conceivably the lower bearing could instead be eccentrically mounted or broadly, even the combination of bearings or else both bearings could be eccentrically mounted.

Variations within the spirit and scope of the invention described are equally comprehended by the foregoing description.

What is claimed is:

1. In an automotive vehicle having an engine compartment at the forward part of the vehicle and a propulsion engine mounted therein, a pair of spaced longitudinal vehicle frame members disposed at the respective sides of the engine compartment and having relatively horizontal rear portions and generally forwardly and downwardly extending portions forming an angle with the rear portions, said forwardly and downwardly extending portions having a frame front cross member supportedly connected therebetween for supporting engine mountings and said rear portions being disposed generally adjacent the plane of the top of the vehicle engine and each having substantially vertically aligned kingpin bearings therein, a steerable wheel suspension assembly for each longitudinal frame member comprising a kingpin journalled to rotate in the kingpin bearings of the frame member and having top and bottom ends protruding from the same, an arm structure disposed substantially in a vertical plane and secured to the bottom end of the kingpin, said arm structure having a horizontal portion and a forwardly and downwardly extending link-supporting portion forming an angle with respect to the horizontal portion and disposed underneath the frame member such as when caused to turn about the axis of the kingpin to pass non-interferingly about the forwardly and downwardly extending portion of the frame member; vertically spaced trailing links pivoted to the link-supporting portion of the arm structure so as to trail from and swing in the said vertical plane of the same, an angled spring seat structure having means including a wheel-connected member providing articulated connections between portions of the spring seat structure and the trailing end of each of the respective trailing links, and coil spring means connected between and engaging the angled spring seat structure and the horizontal portion of the arm structure, and a steering tie rod extending laterally of the engine compartment and having crank arm means connecting the lateral end portions thereof to the top ends of the respective kingpins for the steerable wheel suspension assemblies so as to be disposed for steering movement above the plane of the top of the vehicle engine in the vicinity of the latter.

2. In an automotive vehicle having an engine compartment at the forward part of the vehicle and a propulsion engine mounted therein, a pair of spaced apart stationary members disposed at the respective sides of the engine compartment and having horizontal portions disposed generally adjacent the plane of the top of the vehicle engine and each having substantially vertically aligned kingpin bearings therein, a steerable wheel suspension assembly for each said stationary member comprising a kingpin journalled to rotate in the kingpin bearings of the stationary member and having top and bottom ends protruding from the same, an arm structure disposed substantially in a vertical plane and secured to the bottom end of the kingpin, said arm structure having a horizontal portion and a forwardly and downwardly extending link-supporting portion forming an angle with respect to the horizontal portion and disposed underneath the corresponding stationary member such as when caused to rotate with respect thereto about the axis of the kingpin to pass non-interferingly below the stationary member, vertically spaced trailing links, means pivotally connecting the forward end of the lower of said links to the forwardly and downwardly extending end portion of the arm structure for swinging movement in the plane of the latter, a wheel spindle affixed to the trailing end of the lower link, angled spring seat structure, a telescopic shock absorber pivotally connected at the opposite ends thereof to respective intermediate portions of the arm structure and lower link, means pivotally connecting the forward end of the upper link to the arm structure at the point of attachment of the shock absorber to the intermediate portion of the arm structure, means including the wheel spindle providing articulated connections between portions of the angled spring seat structure and the trailing ends of the respective trailing links, coil spring means connected between and engaging the angled spring seat structure and the horizontal portion of the arm structure, and rubber bumper means disposed within the coil spring means and connected to one of the just-named two said structures so as to be engageable with means on the other said structure during extreme movement of approach of the two said structures relative to one another, said coil spring means and said rubber bumper means being substantially vertically aligned with the bottom end of said kingpin but extending in a direction opposite thereto relative to the respective top and bottom sides of the horizontal portion of the arm structure, and a steering tie rod extending laterally of the engine compartment and having crank arm means connecting the respective end portions thereof to the top ends of the kingpins of the respective steerable wheel suspension assemblies such that the tie rod is disposed for steering movement above the plane of the top of the vehicle engine in the vicinity of the latter.

3. In an automotive vehicle having an engine compartment at the forward part of the vehicle and a propulsion engine mounted therein, a pair of spaced longitudinal vehicle frame members disposed at the respective sides of the engine compartment and having relatively horizontal rear portions and generally forwardly and downwardly extending portions forming an angle with the rear portions, said forwardly and downwardly extending portions having a frame front cross member supportedly connected therebetween for supporting engine mountings and said rear portions being disposed generally adjacent the plane of the top of the vehicle engine and each having substantially vertically aligned kingpin bearing means therein, a steerable wheel suspension assembly for each longitudinal frame member comprising a kingpin journalled to rotate in the kingpin bearing means of the frame member and having top and bottom ends protruding from the same, an arm structure disposed substantially in a vertical plane and secured to the bottom end of the kingpin, said arm structure having a horizontal portion and a forwardly and downwardly extending link supporting portion forming an angle with respect to the horizontal portion and disposed underneath the frame member such as when caused to turn about the axis of the kingpin to pass non-interferingly about the forwardly and downwardly extending portions of the frame member; vertically spaced trailing links pivoted to the link-suporting portion of the arm structure so as to trail from and swing in the said vertical plane of the same, an angled spring seat structure having means including a wheel-connected member providing articulated connections between portions of the spring seat structure and the trailing end of each of the respective trailing links, and coil spring means connected between and engaging the angled spring seat structure and the horizontal portion of the arm structure.

4. In an automotive vehicle having an engine compartment at the forward part of the vehicle and a propulsion engine mounted therein, a pair of spaced longitudinal vehicle frame members disposed at the respective sides of the engine compartment and having relatively horizontal rear portions and generally forwardly and downwardly extending portions forming an angle with the rear portions, said forwardly and downwardly extending portions having a frame front cross member supportedly connected therebetween for supporting engine mountings and said rear portions being disposed generally adjacent the plane of the top of the vehicle engine and each having substantially vertically aligned kingpin bearings therein, a steerable wheel suspension assembly for each longitudinal frame member comprising a kingpin journalled to rotate in the kingpin bearings of the frame member and having top and bottom ends protruding from the same, an arm structure disposed substantially in a vertical plane and secured to the bottom end of the kingpin, said arm structure having a horizontal portion and a forwardly and downwardly extending link-supporting portion forming an angle with respect to the horizontal portion and disposed underneath the frame member such as when caused to turn about the axis of the kingpin to pass non-interferingly about the forwardly and downwardly extending portions of the frame member; vertically spaced trailing links pivoted to the link-supporting portion of the arm structure so as to trail from and swing in the said vertical plane of the same, an angled spring seat structure having means including a wheel-connected member providing articulated connections between portions of the spring seat structure and the trailing end of each of the respective trailing links, and coil spring means connected between and engaging the angled spring seat structure and the horizontal portion of the arm structure, and rubber bumper means disposed within the coil spring means and connected to one of the just-named two said structures so as to be engageable with means on the other said structure during extreme movement of approach of the two said structures relative to one another.

5. In an automotive vehicle having an engine compartment at the forward part of the vehicle and a propulsion engine mounted therein, a pair of spaced apart stationary members disposed at the respective sides of the engine compartment and having horizontal portions disposed generally adjacent the plane of the top of the vehicle engine and each having substantially vertically aligned kingpin bearings therein, a steerable wheel suspension assembly for each said stationary member comprising a kingpin journalled to rotate in the kingpin bearings of the stationary member and having top and bottom ends protruding from the same, an arm structure disposed substantially in a vertical plane and secured to the bottom end of the kingpin, said arm structure having a horizontal portion and a forwardly and downwardly extending link-supporting portion forming an angle with respect to the horizontal portion and disposed underneath the corresponding stationary member such as when caused to rotate with respect thereto about the axis of the kingpin to pass non-interferingly below the stationary member, vertically spaced trailing links, means pivotally connecting the forward end of the lower of said links to the forwardly and downwardly extending end portion of the arm structure for swinging movement in the plane of the latter, a wheel spindle affixed to the trailing end of the lower link, angled spring seat structure, a telescopic shock absorber pivotally connected at the opposite ends thereof to respective intermediate portions of the arm structure and lower link, means pivotally connecting the forward end of the upper link to the arm structure at the point of attachment of the shock absorber to the intermediate portion of the arm structure, means including the wheel spindle providing articulated connections between portions of the angled spring seat structure and the trailing ends of the respective trailing links, coil spring means connected between and engaging the angled spring seat structure and the horizontal portion of the arm structure, and rubber bumper means disposed within the coil spring means and connected to the horizontal portion of the arm structure so as to be engageable with means on the said angled spring seat structure during extreme movement of approach of the two said structures relative to one another, said coil spring means and said rubber bumper means being substantially vertically aligned with the bottom end of said kingpin but extending in a direction opposite thereto relative to the respective top and bottom sides of the horizontal portion of the arm structure, and a steering tie rod extending laterally of the engine compartment and having crank arm means connecting the respective end portions thereof to the top ends of the kingpins of the respective steerable wheel suspension assemblies such that the tie rod is disposed for steering movement above the plane of the top of the vehicle engine.

6. In an automotive vehicle having an engine compartment at the forward part of the vehicle and a propulsion engine mounted therein, a pair of spaced longitudinal vehicle frame members disposed at the respective sides of the engine compartment and having relatively horizontal rear portions and generally forwardly and downwardly end portions forming an angle with respect to the rear portions, said forwardly and downwardly extending end portions having a frame front cross member supportedly connected therebetween for supporting engine mountings and said rear portions being disposed generally adjacent the plane of the top of the vehicle engine and each having substantially vertically aligned kingpin bearings therein, a steerable wheel suspension assembly for each longitudinal frame member comprising a kingpin journalled to rotate in the kingpin bearings of the frame member and having top and bottom ends protruding from the latter, an arm structure disposed substantially in a vertical plane and secured to the bottom end of the kingpin, said arm structure having a horizontal portion and a forwardly and downwardly extending link-supporting portion forming an angle with respect to the horizontal portion and disposed underneath the frame member such that when caused to turn with respect to the frame member about the axis of the kingpin to pass non-interferingly about the forwardly and downwardly extending portion of the frame member, vertically spaced trailing links, means including spaced bearings and a horizontal trunnion journalled therein for pivotally connecting the forward end of the lower of said links to the forwardly and downwardly extending end portion of the arm structure for swinging movement in the plane of the latter, a wheel spindle affixed to the trailing end of the lower link, a telescopic shock absorber pivotally connected at the opposite ends thereof to respective intermediate portions of the arm structure and lower link, means pivotally connecting the forward end of the upper link to the arm structure at the location of the point of attachment of the shock absorber to the intermediate portion of the arm structure, angled spring seat structure, means including the wheel spindle providing articulated connections between portions of the angled spring seat structure and the trailing ends of the respective trailing links, a one-piece stabilizer bar of a general bow shape between its end portions and extending transversely of the vehicle, said stabilizer bar having a mid portion mounted upon and journalled to rotate with respect to the forwardly and downwardly extending end portions of the longitudinal frame members, and having the end portions thereof respectively connected for movement with the angled spring seat structure of each steerable wheel suspension assembly, coil spring means connected between and engaging the angled spring seat structure and the horizontal portion of the arm structure, and rubber bumper means disposed within the coil spring means and connected to one of the just-named two said structures so as to be engageable with means on the other said structure during extreme movement of approach of the two said structures relative to one another, said coil spring means and said rubber bumper means being substantially vertically aligned with the bottom end of said kingpin but extending in a direction opposite thereto relative to the respective top and bottom sides of the horizontal portion of the arm structure.

7. In an automotive vehicle having an engine compartment at the forward part of the vehicle and a propulsion engine mounted therein, a pair of spaced longitudinal vehicle frame members disposed at the respective sides of the engine compartment and having relatively horizontal rear portions and generally forwardly and downwardly end portions forming an angle with respect to the rear portions, said forwardly and downwardly extending end portions having a frame front cross member supportedly connected therebetween for supporting engine mountings and said rear portions being disposed generally adjacent the plane of the top of the vehicle engine and each having substantially vertically aligned kingpin bearings therein, a steerable wheel suspension assembly for each longitudinal frame member comprising a kingpin journalled to rotate in the kingpin bearings of the frame member and having top and bottom ends protruding from the latter, an arm structure disposed substantially in a vertical plane and secured to the bottom end of the kingpin, said arm structure having a horizontal portion and a forwardly and downwardly extending link-supporting portion forming an angle with respect to the horizontal portion and disposed underneath the frame member such that when caused to turn with respect to the frame member about the axis of the kingpin to pass non-interferingly about the forwardly and downwardly extending portion of the frame member, vertically spaced trailing links, means pivotally connecting the forward end of the lower of said links to the forwardly and downwardly extending end portion of the arm structure for swinging movement in the plane of the latter, a wheel spindle affixed to the trailing end of the lower link, means pivotally connecting the forward end of the upper link to an intermediate portion of the arm structure, angled spring seat structure, means including the wheel spindle providing articulated connections between portions of the angled spring seat structure and the trailing ends of the respective trailing links, coil spring means connected between and engaging the angled spring seat structure and the horizontal portion of the arm structure, and rubber bumper means disposed within the coil spring means and connected to the horizontal portion of the arm structure so as to be engageable with means on the said angled spring seat structure during extreme movement of approach of the two said structures relative to one another, said coil spring means and said rubber bumper means being substantially vertically aligned with the bottom end of said kingpin but extending in a direction opposite thereto relative to the respective top and bottom sides of the horizontal portion of the arm structure, and a steering tie rod extending laterally of the engine compartment and having crank arm means connecting the respective end portions thereof to the top ends of the kingpins of the respective steerable wheel suspension assemblies such that the tie rod is disposed for steering movement above the plane of the top of the vehicle engine at least in the vicinity of the latter.

8. In an automotive vehicle suspension having an engine compartment at the forward part of the vehicle and a propulsion engine mounted therein, a pair of spaced longitudinal vehicle frame members disposed at the respective sides of the engine compartment and having relatively horizontal rear portions and generally forwardly and downwardly extending portions forming an angle with the rear portions, said forwardly and downwardly extending portions having a frame front cross member supportedly connected therebetween for supporting engine mountings, and said rear portions being disposed generally adjacent the plane of the top of the vehicle engine and each having a substantially vertical bearing opening provided with vertically spaced kingpin bearings mounted therein, said kingpin bearings including a lower bearing member having a race thereof concentrically mounted with respect to the bearing opening in the longitudinal frame member, and an upper bearing eccentrically mounted and adjustable in its own plane so as to be eccentrically adjustable with respect to the bearing opening in the longitudinal frame member, a steerable wheel suspension assembly for each longitudinal frame member comprising a kingpin, said kingpin being journalled in said kingpin bearings for relative rotation with respect to said bearing opening and being eccentrically adjustable in said upper kingpin bearing with respect to the bearing opening in the frame member so as to provide for caster and camber adjustment for the wheel suspension assembly, said kingpin having top and bottom ends protruding from the respective bearings and from the top and bottom sides of the vehicle frame member, an arm structure disposed substantially in a vertical plane and secured to the bottom end of the kingpin, said arm structure having a horizontal portion and a forwardly and downwardly extending link-supporting portion forming an angle with respect to the horizontal portion and disposed underneath the frame member such as when caused to turn about the adjustable axis of the kingpin to pass non-interferingly about the forwardly and downwardly extending portions of the frame member, vertically spaced trailing links pivoted to the link-supporting portion of the arm structure so as to trail from and swing substantially in the said vertical plane of the arm structure, an angled spring seat structure having means including a wheel-connected member providing articulated connections between portions of the spring seat structure and the trailing end of each of the respective trailing links, and coil spring means connected between and engaging the angled spring seat structure and the horizontal portion of the arm structure.

9. In an automotive vehicle having an engine compartment at the forward part of the vehicle and a propulsion engine mounted therein, a pair of spaced apart stationary members disposed at the respective sides of the engine compartment and having relatively horizontal portions disposed generally adjacent the plane of the top of the vehicle engine and each being provided with vertically spaced kingpin bearings which are axially aligned along a generally up and down axis which forms a slight angle to the vertical, a steerable wheel suspension assembly for each said stationary member comprising a kingpin disposed in the kingpin bearings of the stationary member, said kingpin having top and bottom ends protruding from the horizontal portion to the stationary member and being journalled in said bearings such that the axis of said kingpin is coincident with said generally up and down bearing axis; an arm structure disposed substantially in a vertical plane and secured to the bottom end of the kingpin, said arm structure having a horizontal portion and a forwardly and downwardly extending link-supporting portion forming an angle with respect to the horizontal portion and disposed underneath the horizontal portion of the stationary member and being turnable with the kingpin about the axis of the latter; vertically spaced trailing links pivoted to the link-supporting portion of the arm structure so as to trail from and swing substantially in the said vertical plane of the same, an angled spring seat structure having means including a wheel-connected member providing articulated connections between portions of the spring seat structure and the trailing end of each of the respective trailing links, coil spring means connected between and engaging the angled spring seat structure and the horizontal portion of the arm structure, and rubber bumper means disposed within the coil spring means and connected to one of the two just-named structures so as to be engageable with means on the other said structure during extreme movement of approach of the said two structures relative to one another.

JOHN P. BUTTERFIELD.
VICTOR HUGHES.

References Cited in the file of this patent

UNITED STATES PATENTS

| Number | Name | Date |
| --- | --- | --- |
| 1,959,548 | Ries | May 22, 1934 |
| 2,043,011 | Schjolin | June 2, 1936 |
| 2,220,916 | Schiff | Nov. 12, 1940 |

FOREIGN PATENTS

| Number | Country | Date |
| --- | --- | --- |
| 281,785 | Germany | Oct. 23, 1912 |